United States Patent
Ogawa et al.

(10) Patent No.: US 7,435,566 B2
(45) Date of Patent: Oct. 14, 2008

(54) METHOD OF PURIFYING 3-HYROXYALKANOIC ACID COPOLYMER

(75) Inventors: Noriko Ogawa, Kobe (JP); Kenji Miyamoto, Yokohama (JP); Fumio Osakada, Okayama (JP); Keiji Matsumoto, Nishinomiya (JP)

(73) Assignee: Kaneka Corporation, Osaka (JP)

( * ) Notice: Subject to any disclaimer, the term of this patent is extended or adjusted under 35 U.S.C. 154(b) by 268 days.

(21) Appl. No.: 10/527,826

(22) PCT Filed: Sep. 30, 2003

(86) PCT No.: PCT/JP03/12486

§ 371 (c)(1),
(2), (4) Date: Oct. 13, 2005

(87) PCT Pub. No.: WO2004/029266

PCT Pub. Date: Apr. 8, 2004

(65) Prior Publication Data

US 2006/0127998 A1 Jun. 15, 2006

(30) Foreign Application Priority Data

Sep. 30, 2002 (JP) .............................. 2002-285863

(51) Int. Cl.
*C12P 7/62* (2006.01)
(52) U.S. Cl. .................................................... 435/135
(58) Field of Classification Search ............ 435/135
See application file for complete search history.

(56) References Cited

U.S. PATENT DOCUMENTS

| 4,358,583 | A | 11/1982 | Walker et al. |
| 4,910,145 | A | 3/1990 | Holmes et al. |
| 4,968,611 | A | 11/1990 | Traussnig et al. |
| 5,292,860 | A | 3/1994 | Shiotani et al. |
| 5,627,276 | A | 5/1997 | Greer |
| 5,952,460 | A | 9/1999 | Liddell et al. |
| 7,314,740 | B2 * | 1/2008 | Miyamoto et al. .......... 435/135 |
| 2003/0032151 | A1 * | 2/2003 | Honma et al. ............... 435/135 |
| 2003/0049806 | A1 * | 3/2003 | Yano et al. .................. 435/135 |

FOREIGN PATENT DOCUMENTS

| EP | 0 015 123 | 9/1980 |
| EP | 0 046 017 A2 | 2/1982 |
| JP | 55-118394 | 9/1980 |
| JP | 57-65193 | 4/1982 |
| JP | 63-198991 | 8/1988 |
| JP | 2-69187 | 3/1990 |
| JP | 4-61638 | 10/1992 |
| JP | 7-31487 | 2/1995 |
| JP | 7-31488 | 2/1995 |
| JP | 7-31489 | 2/1995 |
| JP | 7-79787 | 3/1995 |
| JP | 7-79788 | 3/1995 |
| JP | 7-177894 | 7/1995 |
| JP | 8-502415 | 3/1996 |
| JP | 11-266891 | 10/1999 |
| JP | 2001-46094 | 2/2001 |
| JP | 2001-340095 | 12/2001 |
| JP | 2002-306190 | 10/2002 |
| WO | WO 94/10289 | 5/1994 |
| WO | WO 96/06178 | 2/1996 |
| WO | WO 98/07879 | 2/1998 |

\* cited by examiner

*Primary Examiner*—Herbert J. Lilling
(74) *Attorney, Agent, or Firm*—Kenyon & Kenyon LLP

(57) ABSTRACT

The object of this invention is to provide a method for purifying PHA separated from PHA-containing microbial cells in high purity without incurring any serious decrease in molecular weight. The present invention provides a method for purifying a 3-hydroxyalkanoic acid copolymer produced by a microorganism, which comprises treating an aqueous suspension containing the 3-hydroxyalkanoic acid copolymer separated from a microorganism with a hydrogen peroxide while controlling the pH of said aqueous suspension by adding an alkali either continuously or intermittently.

9 Claims, 1 Drawing Sheet

METHOD OF PURIFYING 3-HYROXYALKANOIC ACID COPOLYMER

This is a 371 national phase application of PCT/JP2003/012486 filed 30 Sep. 2003, claiming priority to Japanese Application No. 2002-285863 filed 30 Sep. 2002, the contents of which are incorporated herein by reference.

TECHNICAL FIELD

The present invention relates to a method for purifying a 3-hydroxyalkanoic acid copolymer produced by a microbial cell.

BACKGROUND ART

A poly-3-hydroxyalkanoic acid (hereinafter referred to collectively as "PHA") is a thermoplastic polyester which is synthesized and accumulated as an energy storage substance in cells of a variety of microorganisms and has biodegradability. These days waste plastics are disposed of by incineration or landfill but there are several problems in these disposal methods, such as global warming and ground loosening of reclaimed lands. Therefore, with the growing public awareness of the importance of plastics recycling, ways and means for systematized recycling are being developed. However, uses amenable to such recycling are limited. Actually the disposal load of waste plastics cannot be completely liquidated by said incineration, landfill, and recycling but rather a large proportion of the disposal load is not disposed of but simply left in nature. There is accordingly a mounting interest in PHA and other biodegradable plastics which, after disposal, would be incorporated into the natural cycle of matters and degradation products of which would not exert ecologically harmful influences, and their practical utilizations are highly desired. Particularly a PHA which a microorganism synthesizes and accumulates in their cells is taken up in the carbon cycle of the natural world and it is, therefore, predicted that it will not have any appreciable adverse effects on the ecosystem. Also in the field of medical treatment, it is considered possible to use a PHA as an implant material which does not require recovery or a vehicle for a drug.

Since the PHA synthesized by a microorganism usually forms granules and is accumulated intracellularly, exploitation of the PHA as a plastic requires a procedure for separating it from microbial cells. The known technology for the separation and purification of PHA from microbial cells can be roughly classified into technologies which comprise extracting a PHA from the cells with an organic solvent solving PHA and technologies which comprise removing the cell components other than PHA by cell disruption or solubilization.

Referring to the separation and purification technology of a PHA involving an extraction with an organic solvent, an extraction technique utilizing a halogen-containing hydrocarbon, such as 1,2-dichloroethane or chloroform, as the solvent solving a PHA is known (refer to Japanese Kokai Publication Sho-55-118394 and Japanese Kokai Publication Sho-57-65193). However, since these halogen-containing hydrocarbons are hydrophobic solvents, a pre-extraction procedure, such as drying cells in advance or otherwise, allowing the solvent to directly contact the intracellular PHA is required. Moreover, in such a technology, dissolving PHA at a practically useful concentration (for example, 5%) or higher gives only an extract which is so highly viscous that it involves considerable difficulties in separating the undissolved residues of microbial cells from the PHA-containing solvent layer. Furthermore, in order that PHA may be reprecipitated from the solvent layer at a high recovery, some PHA-insoluble solvent, such as methanol or hexane, need to be used in a large quantity, e.g. 4 to 5 volumes based on the solvent layer, and thus a vessel of large capacity is required for reprecipitation. In addition, the necessary quantity of solvents is so large that both the solvent recovery cost and the cost of lost solvents are enormous. Furthermore, since the use of organohalogen compounds tends to be limited these days for protection of the environment, industrial application of this technology has many obstacles to surmount.

Under the circumstances, there has been proposed an extraction technology using a solvent which is not only capable of dissolving PHA but also miscible with water, for example a hydrophilic solvent such as dioxane (refer to Japanese Kokai Publication Sho-63-198991), propanediol (refer to Japanese Kokai Publication Hei-02-69187), or tetrahydrofuran (refer to Japanese Kokai Publication Hei-07-79788). These methods appear to be favorable partly because PHA can be extracted not only from dry cells but also from wet cells and partly because precipitates of PHA can be obtained by mere cooling of the solvent layer separated from the microbial cell residues. However, even with these methods, the problem of high viscosity of the PHA-containing solvent layer remains to be solved. In addition, while heating is required for enhancing the extraction efficiency, the heating in the presence of water unavoidably results in a decrease in molecular weight and a poor recovery of PHA.

On the other hand, as the technology of removing the cell components other than PHA by solubilization for separation of PHA, J. Gen. Microbiology, vol. 19, 198-209 (1958) describes a technology which comprises treating a suspension of microbial cells with sodium hypochlorite to solubilize cell components other than PHA and recovering PHA. This technology is simple process-wise but the necessity to use a large amount of sodium hypochlorite is a factor leading to a high production cost. Moreover, in view of the marked decrease in molecular weight of PHA and the appreciable amount of chlorine left behind in PHA, this technology is not considered to be suitable for practical use.

Japanese Kokoku Publication Hei-04-61638 describes a process for separating PHA which comprises subjecting a suspension of PHA-containing microbial cells to a heat treatment at a temperature of 100° C. or higher to disrupt the cellular structure and, then, subjecting the disrupted cells to a combination treatment with a protease and either a phospholipase or hydrogen peroxide to solubilize the cell components other than PHA. This technology is disadvantageous in that because the heat treatment induces denaturation and insolubilization of the protein, the load of subsequent protease treatment is increased, that the process involves many steps and is complicated, and that it costs much due to the use of relatively expensive enzymes.

As a technology for disrupting PHA-containing microbial cells, there also has been proposed a method which comprises treating microbial cells with a surfactant, decomposing the nucleic acids released from the cells with hydrogen peroxide, and separating PHA (refer to Japanese Kohyo Publication Hei-08-502415) but the waste liquor containing the surfactant develops a copious foam and, in addition, has a high BOD load value. From these points of view, the use of a surfactant is objectionable for production on a commercial scale.

There has also been proposed a technology for separating PHA which comprises disrupting PHA-containing microbial cells with a high-pressure homogenizer (refer to Japanese Kokai Publication Hei-07-177894 and Japanese Kokai Publication Hei-07-31488). However, this technology has the drawback that PHA with high purity cannot be obtained unless a suspension of microbial cells is subjected to a high-pressure treatment at least 3 times, or 10 times, if necessary, with heating, and even then the purity of thus-obtained PHA that can be attained is as low as about 65 to 89%.

There has also been proposed a technology for separating PHA which comprises adding an alkali to a suspension of PHA-containing microbial cells, heating the suspension, and disrupting the cells (refer to Japanese Kokai Publication Hei-07-31487). However, this technology is disadvantageous in that the purity of the product polymer that can be attained is as low as 75.1 to 80.5% and that if the level of addition of the alkali be raised to improve the yield, the molecular weight of the polymer would be decreased. Several techniques for carrying out physical disruption after addition of an alkali have been proposed (refer to Japanese Kokai Publication Hei-07-31489 and Bioseparation, 1991, vol. 2, 95-105) but since the alkali treatment alone results in the extracellular release of only a small amount of cell components and some of such cell components are retained in the PHA fraction even after subsequent high-pressure disruption treatment, these techniques are invariably inefficient. Thus, PHA of high purity cannot be separated unless the microbial cell suspension is subjected to at least 5 cycles of high-pressure treatment and even then the purity of PHA is as low as about 77 to 85%. The technology involving addition of an alkali has an additional drawback; generally the cell components released from microbial cells, particularly nucleic acids, increase the viscosity of the cell suspension to make subsequent processing difficult.

There has also been proposed a technology in which a suspension of PHA-containing microbial cells is adjusted to an acidity lower than pH 2 and PHA is separated at a temperature not below 50° C. (refer to Japanese Kokai Publication Hei-11-266891). However, this technology is disadvantageous in that the treatment under the strongly acidic condition below pH 2 is undesirable for production on a commercial scale, that the acid treatment needs to be followed by adjustment to the alkaline side for enhanced purity but this entails massive salt formation, and that the molecular weight of the product PHA is decreased from 2,470,000 to about 1,000,000.

Japanese Kokai Publication 07-177894 proposes a technology for separating and purifying poly-3-hydroxybutyrate (hereinafter referred to as PHB) by treating microbial cells with an oxygen bleach after conducting a high-pressure disruption treatment. Although a method for treating PHB slurry with various oxygen bleaches is disclosed, there is no description about pH in the bleaching treatment.

SUMMARY OF THE INVENTION

In view of the above-mentioned state of the art, an object of the present invention is to provide a purification method which comprises removing cell components other than the 3-hydroxyalkanoic acid copolymer from 3-hydroxyalkanoic acid copolymers produced by microbial cells effectively in only a few steps without incurring any serious decrease in molecular weight, and is capable of producing a 3-hydroxyalkanoic acid copolymer with high purity in high yield without yellowing or stench in melting.

The inventors of the present invention found a subject that marked decrease in molecular weight of 3-hydroxyalkanoic acid copolymers is caused in carrying out a hydrogen peroxide treatment in comparison with the case of 3-hydroxyalkanoic acid homopolymer, and made intensive investigations for solving this problem. As a result, the present inventors found that the serious decrease in molecular weight may be prevented by controlling the pH of an aqueous suspension containing the 3-hydroxyalkanoic acid polymer with an alkali in carrying out the hydrogen peroxide treatment.

The present invention, therefore, relates to a method for purifying 3-hydroxyalkanoic acid copolymers produced by microbial cells, which comprises adding an alkali to an aqueous suspension containing the 3-hydroxyalkanoic acid copolymer separated from microorganisms either continuously or intermittently to control the pH of said aqueous suspension in carrying out a treatment by hydrogen peroxide.

The present invention is now described in detail.

DETAILED DESCRIPTION OF THE INVENTION

The microorganism for use in the present invention is not particularly restricted provided that it is a microorganism containing the 3-hydroxyalkanoic acid copolymer as intracellularly accumulated. For example, microorganisms of the genus *Alcaligenes*; those of the genus *Ralstonia*; those of the genus *Pseudomonas*; those of the genus *Bacillus*, those of the genus *Azotobacter*; those of the genus *Nocardia*; and those of the genus *Aeromonas* may be mentioned. Among them, preferred are strains of *A. lipolytica, A. latus, A. caviae, A. hydrophila* and *R. eutropha*, further preferred are strains transformed by a 3-hydroxyalkanoic acid copolymer synthase group gene derived from *A. caviae*, and particularly preferred are *R. eutropha* (old name: *Alcaligenes eutrophus* AC32 (deposited on Budapest Treaty, international depositary authority: National Institute of Advanced Industrial Science and Technology International Patent Organism Depositary, Chuo 6, 1 Higashi 1 chome, Tsukuba-shi, Ibaraki-ken, Japan, date of deposit: Aug. 7, 1997, Deposition No. FERM BP-6038, as transferred from FERM P-15786 originally deposited (J. Bacteriol., 179, 4821-4830 (1997)). Cells are used, in which 3-hydroxyalkanoic acid is accumulated intracellularly by culturing in a suitable condition. The cultural method is not particularly restricted but the known method described in Japanese Kokai Publication Hei-05-93049, among others, can for example be employed.

The term "a 3-hydroxyalkanoic acid copolymer" as used in this specification is a generic term meaning any and all polymers constituted from a 3-hydroxyalkanoic acid. Although the 3-hydroxyalkanoic acid units of such polymers are not particularly restricted, a copolymer of D-3-hydroxybutyrate (3HB) and one or more other 3-hydroxyalkanoic acids, and a copolymer of various 3-hydroxyalkanoic acids inclusive of D-3-hydroxyhexanoate (3HH) can be mentioned by way of example. Moreover, there may be mentioned, various copolymers constituted from at least two species of monomers selected from a group consisting of 3-hydroxypropionate, 3-hydroxybutyrate, 3-hydroxyvalerate, 3-hydroxyhexanoate, 3-hydroxyheptanoate and 3-hydroxyoctanoate. Particularly preferred is the copolymer containing 3HH as a monomeric unit, for example a binary copolymer comprising of 3HB and 3HH (PHBH)(Macromolecules, 28, 4822-4828 (1995)) or a ternary copolymer comprising of 3HB, D-3-hydroxyvalerate (3HV) and 3HH (PHBVH) (Japanese Patent No. 277757, Japanese Kokai Publication Hei-08-289797) from the standpoint of physical characteristics of the product polyester. The compositional ratio of the monomer units constituting a binary copolymer PHBH comprising of 3HB and 3HH is not particularly restricted but copolymers containing 1 to 99 mol % of the 3HH unit are suitable. The compositional ratio of the monomer units constituting a ternary copolymer comprising of 3HB, 3HV, and 3HH is not particularly restricted, but copolymers containing 1 to 95 mol % of the 3HB unit, 1 to 96 mol % of the 3HV unit, and 1 to 30 mol % of the 3HH unit are preferred.

The term "a 3-hydroxyalkanoic acid copolymer separated from microorganisms" as used in this specification means a 3-hydroxyalkanoic acid copolymer liberated from microorganisms by disrupting microbial cells containing 3-hydroxyalkanoic acid copolymers. The method for disrupting the microbial cells are not particularly restricted, but includes the conventional well-known physical disruptions, disruptions by addition of an alkali and the like disruptions.

The term "an aqueous suspension containing 3-hydroxyalkanoic acid copolymers separated from microorganisms" as used in this specification is not particularly restricted provided that the one in which the 3-hydroxyalkanoic acid copolymer separated from microorganisms is suspended in water. It is permissible for an organic solvent to coexist in a range no adverse effect is caused. Generally, cell constitutive substances, etc. generated by disruption of microbial cells are incorporated in said suspension.

The above-mentioned aqueous suspension is preferably that obtained by, while stirring a suspension of 3-hydroxyalkanoic acid copolymer-containing strains, solubilizing the total or part of cell constituent substances other than the 3-hydroxyalkanoic acid copolymer to separate the 3-hydroxyalkanoic acid copolymer by adding an alkali simultaneously with physical disruption, and suspending the 3-hydroxyalkanoic acid copolymer in water.

The concentration of the 3-hydroxyalkanoic acid copolymer in "an aqueous suspension containing the 3-hydroxyalkanoic acid copolymer" in the present invention is preferably not more than 500 g/L, and more preferably not more than 300 g/L from a viewpoint of purification efficiency.

In the present invention, the pH of the above-mentioned suspension is controlled by adding an alkali either continuously or intermittently to the said aqueous suspension, concurrently with a treatment by hydrogen peroxide. The serious decrease in molecular weight of the 3-hydroxyalkanoic acid polymers may be prevented as well as decomposition of protein (cell constituent substance remaining in the suspension) by hydrogen peroxide may be carried out by these treatments.

The alkali for use in the practice of the invention is not particularly restricted provided that the suspension pH may be controlled within the herein-defined range. The specific examples thereof include alkali metals or hydroxides of an alkaline earth metal such as sodium hydroxide, potassium hydroxide, lithium hydroxide and calcium hydroxide; alkali metal carbonates such as sodium carbonate and potassium carbonate; organic acid alkali metal salts such as sodium acetate and potassium acetate; alkali metal borates such as borax; alkali metal phosphates such as trisodium phosphate, disodium hydrogen phosphate, tripotassium phosphate and dipotassium hydrogen phosphate, and aqueous ammonia, among others. Among these, sodium hydroxide, sodium carbonate, and potassium hydroxide are preferred in terms of suitability for commercial production and in cost terms.

In the practice of the invention, the target pH value to be controlled by the alkali addition is not particularly restricted but is preferably not less than pH 7, more preferably not less than pH 8, from the viewpoint of prevention of the decrease in molecular weight of the copolymer. The upper limit thereof is preferably not more than pH 13, and more preferably not more than pH 12. Particularly, the pH is preferably adjusted in a range between 8 to 11.

The latitude of pH control is preferably within ±1 of the set value, more preferably within ±0.5 of the set value.

In the present invention, there is no particular limitation on the speed for adding an alkali. The alkali is preferably added at such a speed that the pH may be controlled within the desired range while measuring the pH transition of the above aqueous suspension.

Generally, when the 3-hydroxyalkanoic acid copolymer is treated with hydrogen peroxide, a phenomenon that the pH of the above aqueous suspension gradually decreases as the purification proceeds is observed. The present invention is to control the pH of said aqueous suspension within a specific range by adding an alkali either continuously or intermittently for restraint of this phenomenon. Adding an excess amount of alkali such that it leads the pH of the solution to be more than pH 14 causes decomposition of hydrogen peroxide, thereby not only the purification efficiency is lowered, but inversely the decrease in the molecular weight of the 3-hydroxyalkanoic acid copolymer tends to be easily caused. On the contrary, if the addition amount of alkali is not sufficient, hydrogen peroxide activity decreases and satisfactory purification effect cannot be obtained. Moreover, if the suspension is inclined to acidic side, the molecular weight of the 3-hydroxyalkanoic acid copolymer tends to be significantly lowered. Only after adding an appropriate amount of alkali either continuously or intermittently to control the pH, it becomes possible to attain two purposes, that is, an improvement of purification efficiency and restraint of the decrease in the molecular weight, simultaneously.

In the present invention, the addition amount of hydrogen peroxide is not particularly restricted, but is preferably not more than 10% by weight, more preferably not more than 5% by weight, still more preferably not more than 1% by weight. Moreover, for obtaining an applicable purification effect, it is preferably not less than 0.01% by weight, more preferably not less than 0.05% by weight, and still more preferably 0.1% by weight.

Particularly in the present invention, it becomes possible to obtain an excellent purification effect by the pH control of the aqueous suspension by adding an alkali even when the addition amount of hydrogen peroxide is decreased. To decrease the addition amount of hydrogen peroxide is quite preferable for enabling cost down of purification process and cutting an expense for wastewater treating. That is, in the practice of the invention, an excellent purification effect can be obtained when the amount is not more than 1% by weight, further even less than 0.5% by weight. In the case the hydrogen peroxide treatment is carried out solely without carrying out the pH control of the aqueous suspension by adding an alkali, sufficient purification effect cannot be attained in such a low concentration.

In the practice of the invention, the treatment of hydrogen peroxide is preferably carried out at a temperature range of not less than room temperature to the boiling point of the aqueous suspension. For enhancing the purification effect in short time, the treatment is preferably carried out at not less than 50° C., more preferably not less than 70° C. Additionally, the treatment is carried out for generally from 10 minutes to 10 hours, preferably for 30 minutes to 5 hours, and more preferably for 1 hour to 3 hours.

After carrying out the hydrogen peroxide treatment, the 3-hydroxyalkanoic acid copolymer may be isolated from the suspension by washing a precipitate obtained by centrifugation with water or an organic solvent, preferably with hydrophilic solvents such as methanol, ethanol, acetone, acetonitrile, tetrahydrofuran, and then, drying.

EXPLANATION OF NUMERALS

Figure 1:
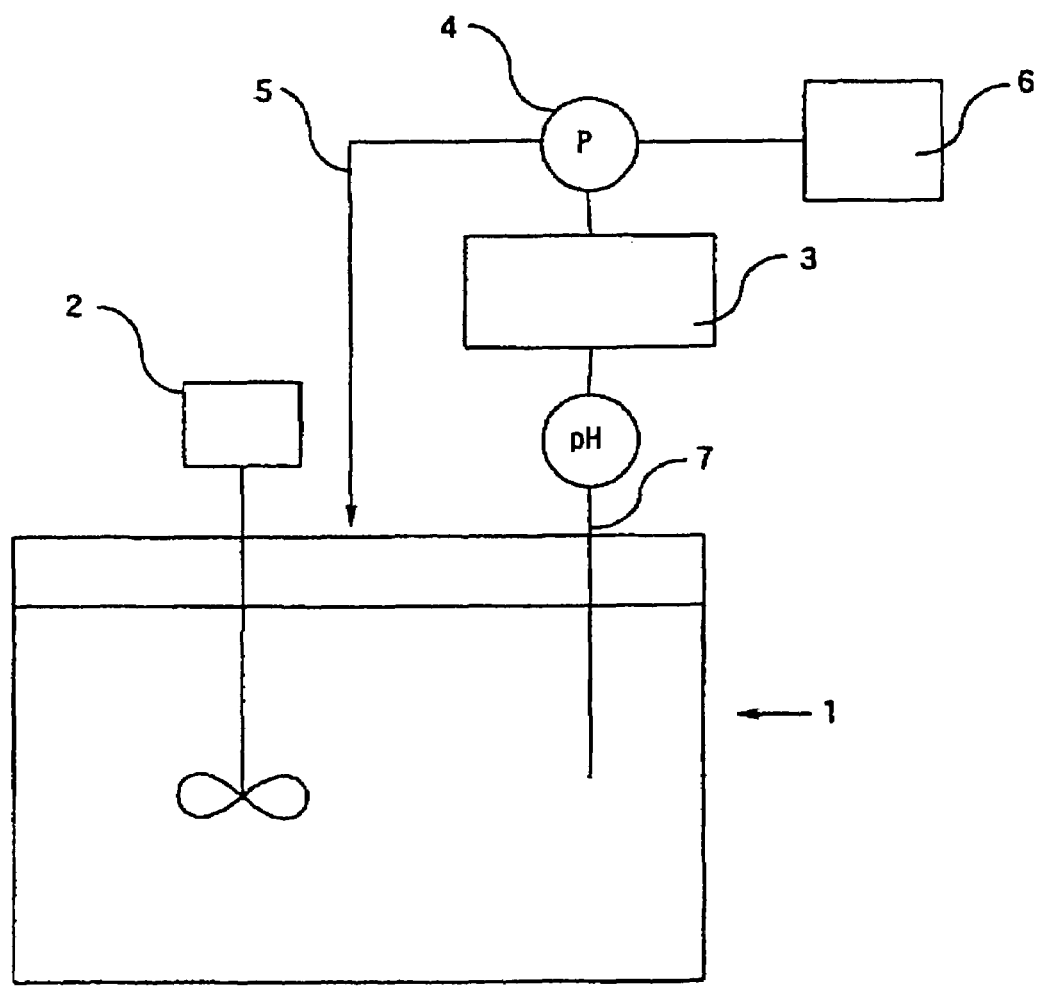
FIG. 1 is a schematic diagram showing one example of the equipment for practicing the purification method according to the present invention.

1 Stirring tank
2 Stirring equipment
3 pH Detection and control equipment
4 Pump
5 Pipe line
6 Alkali storage tank
7 pH Indicator

BEST MODE FOR CARRYING OUT THE INVENTION

The following examples illustrate the present invention in further detail, although the invention is by no means limited to these Examples.

(Method for Measuring the Purity of Polymers)

An aqueous suspension of the polymer was centrifuged (2,400 rpm, 15 min) to remove a supernatant, and the resultant was washed with methanol twice (however, ethanol was used in Example 4 and Comparative Example 3), then heated and dried under reduced pressure to obtain a powder of the polymer. 10 mg of the powder of the polymer was dissolved in 1 ml of chloroform, then 0.85 ml of methanol and 0.15 ml of concentrate sulfuric acid were added thereto, and treated at 100° C. for 140 minutes. After cooling the mixture, 0.5 ml of a saturated solution of ammonium sulfate was added and stirred vigorously, then allowed to stand. The bottom layer was analyzed by capillary gas chromatography to determine the purity of the polymer.

(Method for Measuring the Molecular Weight of Polymers)

The molecular weight of the polymer was determined as follows. 10 mg of a precipitate, as separated from the cells was dissolved in 1 ml of chloroform and the solution was filtered to remove the insoluble substance. The filtrate was analyzed with SHIMADZU Corporation's GPC System fitted with Shodex K805L (300×8 mm, two columns connected in series) using chloroform as the mobile phase.

(Method for Measuring the YI Value in Melting of Polymers)

An aqueous suspension of the polymer was centrifuged (2400 rpm, 15 min) to remove a supernatant, and the resultant was washed with methanol twice (however, ethanol was used in Example 4 and Comparative Example 3), then heated and dried under reduced pressure to obtain each sample. PHBH samples and PHB samples were melted for 10 minutes with an aluminum block heated at 170° C. and 190° C., respectively, to form pellets. The Yellow-Index (YI) value was determined with a spectrophotometer SE-2000 manufactured by Nippon Denshoku Industries Co., Ltd.

(Method for Measuring the Residual Amount of Nitrogen in Polymers)

An aqueous suspension of the polymer was centrifuged (2,400 rpm, 15 min) to remove a supernatant, and the resultant was washed with methanol twice, then heated and dried under reduced pressure to obtain each sample. The respective samples were measured for the nitrogen concentration with a trace nitrogen analyzer TN-10 manufactured by DIA INSTRUMENTS CO., LTD. The values were indicated in terms of protein with multiplying the nitrogen concentration by 6.38.

(Preparation of Aqueous Suspension Containing PHBH Separated from Microbial Cells)

A suspension of PHBH was obtained by culturing *R. eutropha* (old name: *Alcaligenes eutrophus* AC32 (the above-mentioned deposit number FERM BP-6038)) transformed by a 3-hydroxyalkanoic acid copolymer synthase group gene derived from *Aeromonas caviae* in accordance with the protocol given in J. Bacteriol., 179, 4821-4830 (1997) to harvest bacterial cells containing about 67 wt % of PHBH. The pasty cellular fraction separated from the culture medium thus obtained by centrifugation (5,000 rpm, 10 min) was diluted with water to prepare an aqueous suspension of 75 g dried cells/L concentration. The cell constituent substances other than PHBH were solubilized by stirring and disrupting physically while maintaining the pH at 11.7 by adding an aqueous solution of sodium hydroxide as an alkali, and a precipitate was obtained by centrifugation (3,000 rpm, 10 min). The precipitate was further washed with water to separate PHBH having an average molecular weight of approximately 700,000, 3HH mole fraction of 5%, and purity of 91%. The thus obtained PHBH was subjected to the following Examples 1 and 2, and Comparative Examples 1 and 2 as an aqueous suspension of 75 g/L in concentration.

FIG. 1 is a schematic diagram showing one example of equipment for carrying out the purification method of a 3-hydroxyalkanoic copolymer according to the present invention. Of course, the mode of carrying out the invention is by no means limited to the one using the illustrated equipment.

EXAMPLE 1

50 ml of a PHBH aqueous suspension was placed in a 100 ml stirring tank equipped with a pH electrode and incubated at 70° C. The pH electrode was connected to Labo Controller MDL-6C manufactured by B. E. Marubishi Co., Ltd. and the operation parameters were set so that when the pH had dropped below a set value, a peristaltic pump would be actuated to deliver an aqueous solution of sodium hydroxide into the suspension until a set value. With the pH setting of Labo Controller aligned to 10, 30% hydrogen peroxide was added to said suspension in such an amount that the concentration of hydrogen peroxide to be 5% by weight relative to the polymer weight (0.375% by weight relative to the suspension weight), and stirring was continued for 1 hour. Then, the suspension was washed by centrifugation twice with water, further twice with methanol and dried to obtain a powder.

In the same manner, the pH setting of Labo Controller was aligned to 7 and 8 to conduct the above-mentioned treatment. The results are shown in Table 1.

TABLE 1

| pH | Purity (%) | Molecular weight | YI value | Residual amount of nitrogen (%) |
|---|---|---|---|---|
| Before treatment | 91 | 700,000 | 40.9 | 1.21 |
| 7 | 97 | 700,000 | 28.2 | |
| 8 | >99 | 700,000 | 28.3 | |
| 10 | >99 | 700,000 | 18.2 | 0.59 |

From the results, it was found that when the pH is controlled by adding an alkali in the hydrogen peroxide treatment, the purity of the copolymer is improved as well as the molecular weight of the copolymer is not changed and the residual amount of nitrogen is decreased, further yellowing of the copolymer in melting can be inhibited.

EXAMPLE 2

In the same manner as Example 1, the pH setting of Labo Controller was aligned to 10 and the suspension was stirred for 3 hours at 50° C. Then, the suspension was washed by centrifugation twice with water, further twice with methanol, and dried to obtain a powder.

The result is shown in Table 2.

TABLE 2

| Sample | Purity (%) | Molecular weight | YI value |
|---|---|---|---|
| Before hydrogen peroxide treatment | 91 | 700,000 | 40.9 |
| After hydrogen peroxide treatment | 98 | 700,000 | 30.2 |

From the result, it was found that when the hydrogen peroxide treatment is carried out with controlling the pH by adding an alkali, the purity of the copolymer is improved as well as the molecular weight of the copolymer is not changed, and further yellowing of the copolymer in melting can be inhibited.

EXAMPLE 3

A suspension of 110 g of PHBH having the molecular weight of 1,480,000, 3HH mole fraction of 7%, purity of 99% obtained by carrying out the same treatment as above in 1000 ml of water was prepared, and this suspension was placed in a 2000 ml stirring tank equipped with a pH electrode and SILVERSON MIXER and incubated at 70° C. The pH electrode was connected to Labo Controller MDL-6C manufactured by B. E. Marubishi Co., Ltd. and the operation parameters were set so that when the pH of the suspension had dropped below a set value, a peristaltic pump would be actuated to deliver an aqueous solution of sodium hydroxide into the suspension until a set value pH 10. With the rotational speed of the SILVERSON MIXER set to 5,000 rpm, 30% hydrogen peroxide was added to said suspension in such an amount that the concentration of hydrogen peroxide to be 5% by weight relative to the polymer weight (0.375% by weight relative to the suspension weight), and stirring was continued for 50 minutes. Then, the suspension was washed by centrifugation three times with water, further twice with methanol, and dried to obtain a powder. The result is shown in Table 3.

TABLE 3

| Sample | Purity (%) | Molecular weight | YI value |
|---|---|---|---|
| Before hydrogen peroxide treatment | 99 | 1,480,000 | 17.7 |
| After hydrogen peroxide treatment | 99 | 1,440,000 | 11.3 |

From the result, it was found that when the hydrogen peroxide treatment is carried out with controlling the pH by adding an alkali, the molecular weight of the polymer is not changed and yellowing of the copolymer in melting can be inhibited.

Comparative Example 1

50 ml of the same aqueous suspension as that used in Example 1 (pH 7.19) (treatment 1) and 50 ml of a suspension prepared by adding sodium hydroxide to said suspension with the pH being adjusted to 9.16 (treatment 2) were placed in a 100 ml stirring tank and incubated at 70° C. 30% hydrogen peroxide was added to said suspensions in such an amount that the concentration of hydrogen peroxide to be 5% by weight relative to the polymer weight (0.375% by weight relative to the suspension weight), and stirring was continued for 3 hour without adjusting the pH. Then, the suspensions were washed by centrifugation twice with water, further twice with methanol and dried to obtain powders. The results are shown in Table 4.

TABLE 4

| Sample | Starting pH | Finishing pH | Purity (%) | Molecular weight | YI value |
|---|---|---|---|---|---|
| Before hydrogen peroxide treatment | — | — | 91 | 700,000 | 40.9 |
| Treatment 1 | 7.19 | 4.60 | >99 | 620,000 | 31.7 |
| Treatment 2 | 9.16 | 5.32 | >99 | 580,000 | 30.9 |

From the results, it was found that when the hydrogen peroxide treatment is carried out without controlling the pH, the molecular weight of the copolymer drops to as low as less than 90% of that before treatment.

Comparative Example 2

50 ml of the PHBH suspension used in Example 1 was adjusted to pH 5 using diluted hydrochloric acid, and the suspension was placed in a 100 ml stirring tank equipped with a pH electrode and incubated at 70° C. in the same manner as Example 1. With the pH setting of Labo Controller aligned to 5, 30% hydrogen peroxide was added to the suspension in such an amount that the concentration of hydrogen peroxide to be 5% by weight relative to the polymer weight (0.375% by weight relative to the suspension weight), and stirring was continued for 1 hour. Then, the suspension was washed by centrifugation twice with water, further twice with methanol and dried to obtain a powder. The result is shown in Table 5.

TABLE 5

| Sample | Purity (%) | Molecular weight | YI value |
|---|---|---|---|
| Before hydrogen peroxide treatment | 91 | 700,000 | 40.9 |
| After hydrogen peroxide treatment | 99 | 450,000 | 29.1 |

From the results described above, it was found that when the hydrogen peroxide treatment is carried out with controlling the pH with acid, the molecular weight of the copolymer is significantly decreased although the purity of the copolymer is improved and yellowing in melting can be inhibited.

EXAMPLE 4

50 ml of a PHBH suspension, obtained by carrying out the same treatment as described above, which has the molecular weight of 800,000, 3HH mole fraction of 5%, and purity of more than 99% was subjected to the same treatment as Example 1. However, the pH setting of Labo Controller was aligned to 8. The result is shown in Table 6.

Comparative Example 3

Except that hydrogen peroxide was not added, the treatment of Example 4 was otherwise repeated. The result is shown in Table 6.

TABLE 6

| Sample | Purity (%) | Molecular weight | YI value |
|---|---|---|---|
| Before treatment Example 4 | >99 | 800,000 | 15.9 |
| (alkali + hydrogen peroxide treatment) Comparative Example 3 | >99 | 900,000 | 8.3 |
| (alkali heating treatment alone) | >99 | 630,000 | 14.1 |

From the result in Table 6, it was found that the decrease in molecular weight of the copolymer may be prevented and yellowing of the copolymer in melting may be inhibited by carrying out the hydrogen peroxide treatment with controlling the pH by adding an alkali, but when the pH control was carried out solely without carrying out the hydrogen peroxide treatment, the molecular weight decreases and yellowing in melting can be scarcely inhibited.

Reference Example 1

To a 10% aqueous suspension of poly-3-hydrocybutyrate [product of Aldrich Chemical Co., Inc., purity 95%, molecular weight 650,000], 30% hydrogen peroxide was added in such an amount that the concentration of hydrogen peroxide to be 5% by weight relative to the polymer weight (0.375% by weight relative to the suspension weight). The suspension was heated and stirred for 3 hours at 70° C. without adjusting the pH of the aqueous suspension. Then, the suspension was washed by centrifugation twice with water, further twice with methanol, and dried to obtain a powder. The result of the powder is shown in Table 7.

TABLE 7

| Sample | Starting pH | Final pH | Purity (%) | Molecular weight | YI value |
|---|---|---|---|---|---|
| Before hydrogen peroxide treatment | — | — | 95 | 650,000 | 26.5 |
| After hydrogen peroxide treatment | 6.90 | 5.4 | 97 | 650,000 | 15.2 |

It was found that even when the hydrogen peroxide treatment is carried out to the homopolymer without adjusting the pH, no decrease in molecular weight is observed and yellowing in melting can be inhibited.

Reference Example 2

A 10% aqueous suspension of PHB (purity 95%, molecular weight 650,000) was adjusted to pH 5 with diluted hydrochloric acid, and incubated at 70° C. 30% hydrogen peroxide was added to said suspension in such an amount that the concentration of hydrogen peroxide to be 5% by weight relative to the polymer weight (0.375% by weight relative to the suspension weight), and stirring was continued for 3 hours. Then, the suspension was washed by centrifugation twice with water, further twice with methanol and dried to obtain a PHB powder. The molecular weight of the powder was 650,000 and the value before carrying out the hydrogen peroxide treatment was maintained. It was found that PHB maintained the molecular weight even after carrying out the hydrogen peroxide treatment with adding an acid.

From the results in Reference Examples 1 and 2, it was found that, in the case of a homopolymer, the molecular weight does not decrease without controlling the pH with an alkali in carrying out the hydrogen peroxide treatment. Accordingly, it is a unique phenomenon of a copolymer for the decrease in the molecular weight in carrying out the hydrogen peroxide treatment, and according to the purification method of the present invention, the decrease of the molecular weight of the copolymer can be prevented.

INDUSTRIAL APPLICABILITY

The method for purifying 3-hydroxyalkanoic acid copolymers according to the present invention makes it possible to prevent serious decrease of the molecular weight in carrying out the hydrogen peroxide treatment of the 3-hydroxyalkanoic acid copolymers, and to produce the 3-hydroxyalkanoic acid copolymers in high purity without yellowing or stench in melting, by an extremely simple process.

The 3-hydroxyalkanoic acid copolymers having a significant high purity obtained by this method may be used in broad applications and is industrially very useful.

The invention claimed is:

1. A method for purifying a 3-hydroxyalkanoic acid copolymer produced by a microorganism,
   which comprises treating an aqueous suspension containing the 3-hydroxyalkanoic acid copolymer separated from a microorganism with hydrogen peroxide while controlling the pH of said aqueous suspension by adding an alkali either continuously or intermittently,
   wherein the pH of the aqueous suspension is controlled to be between 8 and 13.

2. The purification method according to claim 1, wherein the concentration of hydrogen peroxide in the aqueous suspension is in a range of 0.01 to 1% by weight.

3. The purification method according to claim 1, wherein the 3-hydroxyalkanoic acid copolymer is a copolymer of D-3-hydroxyhexanoate and one or more other D-3-hydroxyalkanoic acids.

4. The purification method according to claim 1, wherein the 3-hydroxyalkanoic acid copolymer is a copolymer constituted of at least two species of monomers selected from a group consisting of 3-hydroxypropionate, 3-hydroxybutyrate, 3-hydroxyvalerate, 3-hydroxyhexanoate, 3-hydroxyheptanoate and 3-hydroxyoctanoate.

5. The purification method according to claim 1, wherein the 3-hydroxyalkanoic acid copolymer is a binary copolymer derived from D-3-hydroxyhexanoate and D-3-hydroxybutyrate, or a ternary copolymer derived from D-3-hydroxyhexanoate, D-3-hydroxybutyrate and D-3-hydroxyvalerate.

6. The purification method according to claim 1, wherein the microorganism producing the 3-hydroxyalkanoic acid copolymer is a microorganism belonging to the genus *Aeromonas*.

7. The purification method according to claim 6, wherein the microorganism producing the 3-hydroxyalkanoic acid copolymer is *Aeromonas caviae* or *Aeromonas hydrophila*.

8. The purification method according to claim 1, wherein the microorganism producing the 3-hydroxyalkanoic acid copolymer is a cell strain of microorganism transformed by a poly-3-hydroxyalkanoic acid synthase group gene derived from *Aeromonas caviae*.

9. The purification method according to claim 1,
wherein the aqueous suspension of the 3-hydroxyalkanoic acid copolymer is obtainable by;
solubilizing the total or part of cell constituent substances other than the 3-hydroxyalkanoic acid copolymer to separate the 3-hydroxyalkanoic acid copolymer by adding an alkali simultaneously with physical disruption while stirring a suspension of a 3-hydroxyalkanoic acid copolymer-containing strain, and
suspending the 3-hydroxyalkanoic acid copolymer in water.

* * * * *